W. G. HAGMAIER.
SAW SHIFTER.
APPLICATION FILED AUG. 18, 1917.
1,344,203.
Patented June 22, 1920.
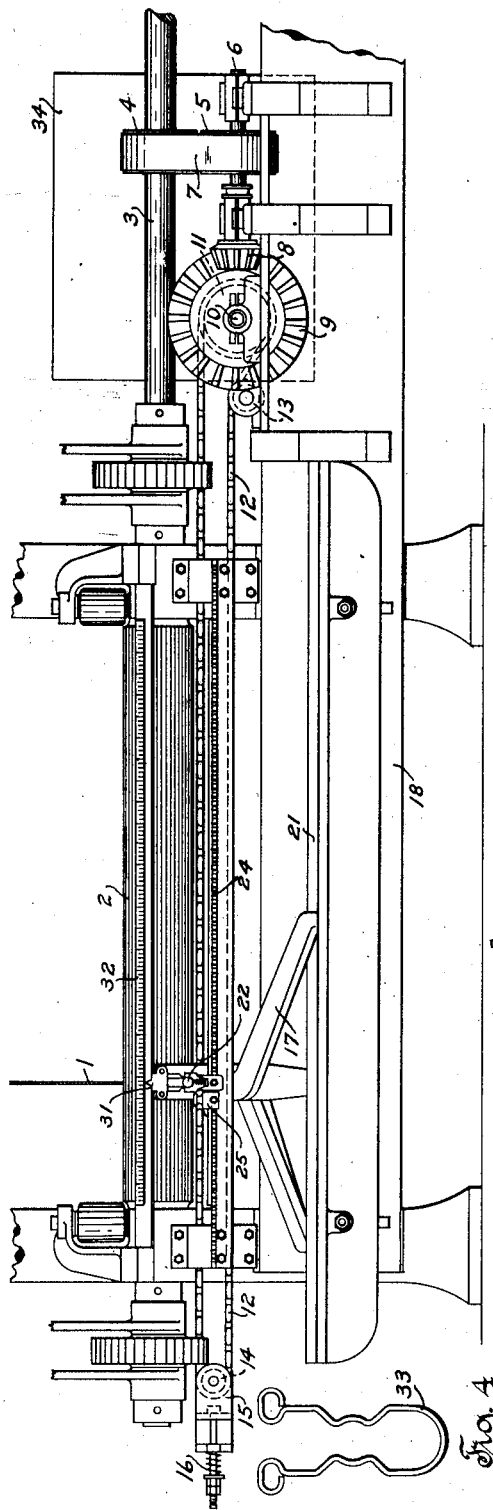
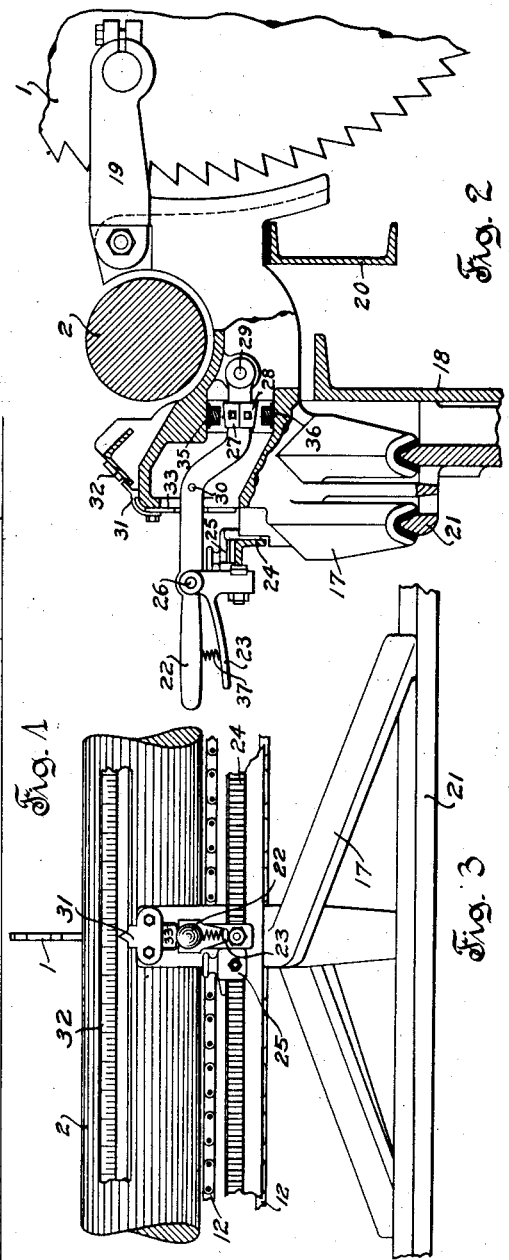
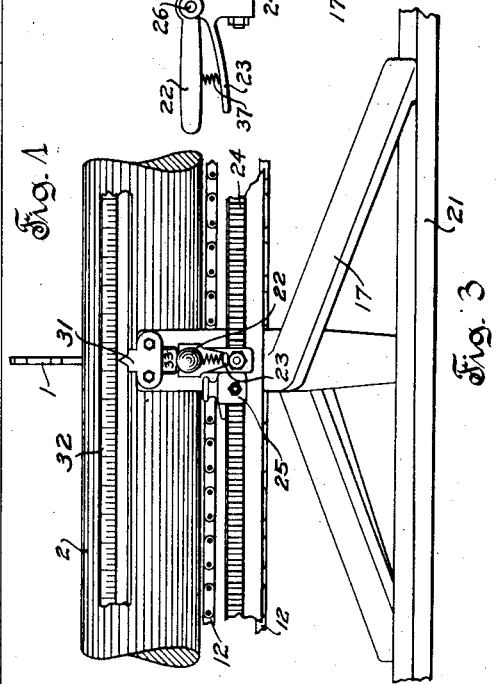
Inventor
W. G. Hagmaier
by
Attorney

UNITED STATES PATENT OFFICE.

WILLIAM G. HAGMAIER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

SAW-SHIFTER.

1,344,203.            Specification of Letters Patent.       Patented June 22, 1920.

Application filed August 18, 1917. Serial No. 187,322.

*To all whom it may concern:*

Be it known that I, WILLIAM G. HAGMAIER, a citizen of the United States, residing at West Allis, in the county of Milwaukee and State of Wisconsin, have invented a certain new and useful Improvement in Saw-Shifters, of which the following is a specification.

This invention relates to improvements in the construction of sawmill machinery, and has particular relation to saw shifting devices especially applicable to that class of machines known as gang edgers.

An object of the invention is to provide simple and efficient power operated means for shifting the saws of gang edgers. One of the more specific objects is to provide a power driven traveling element and means for connecting the saw to this element when it is desired to move the saw laterally. Another object is to provide simple and efficient manually actuated controlling means for connecting the saws with the traveling elements. A further specific object is to provide means for maintaining the saw controlling lever in a predetermined position of setting. Still another specific object is to provide a positive stop for arresting the lateral motion of the saw when the same has reached the desired position.

A clear conception of an embodiment of the invention may be had by referring to the drawing accompanying and forming a part of this specification in which like reference characters designate the same or similar parts in the various views.

Figure 1 is a front elevation of an edger having a power saw shifter applied thereto.

Fig. 2 is an enlarged transverse vertical section through a saw shifting mechanism.

Fig. 3 is an enlarged fragmentary front elevation of a saw shifting mechanism.

Fig. 4 is an enlarged front view of the control lever retaining means.

The edger to which the invention has been disclosed as applied is of ordinary general construction comprising a main frame 18, a plurality of laterally shiftable rotary circular saws 1 (one only of which is illustrated), a shifter bracket 17 for each of the saws 1 slidable upon supports 20, 21 on the frame 18, a shifter arm 19 secured to each bracket 17 and engageable with the adjacent saw 1, and feed rolls 2 mounted in bearings in the frame 18 and normally rotatable by means of feed roll shafts 3. The saws 1 are splined for lateral shifting along their shaft and are rotatable by means of power applied to the saw driving pulley 34, from which power may also, if desired, be transmitted to the feed roll shaft 3. Each shifter bracket 17 is provided with a suitable indicator 31 which coöperates with a gage 32 to indicate the relative positions of the saws 1.

The power means for shifting the saws 1 comprises an endless element or chain 12 having upper and lower oppositely traveling portions, and means for connecting the shifter bracket 17 to either of these traveling portions. While the traveling element or chain 12 is disclosed as a single endless carrier, it will be apparent that two independent oppositely traveling elements might be substituted for this single element. The chain 12 coacts at one end with a driving sprocket 11 secured to a cross countershaft 10 having a bevel gear 9 attached thereto. The bevel gear 9 meshes with a bevel pinion 8 secured to the countershaft 6. The countershaft 6 has secured thereto a pulley 5 which is drivingly connected by means of a belt 7 with a pulley 4 on the feed roll shaft 3. The shafts 6, 10 are mounted in suitable bearings in the main frame 18. The chain 12 coacts at the other end with an idler sprocket 14 mounted in an idler bracket 15 having chain tensioning means 16 associated therewith. A second idler sprocket 13 located adjacent the sprocket 11 serves to keep the upper and lower traveling portions of the chain 12 in parallel relation.

The shifting lever 22 is pivoted to the bracket 17 by means of a horizontal pivot 29. The lever 22 is provided with upper and lower renewable gripping shoes 27, 28 which are respectively engageable with the upper and lower traveling portions of the chain 12. The portions of the chain 12 adjacent the bracket 17 are engageable with upper and lower renewable gripping shoes 35, 36 respectively, of the bracket 17. The lever 22 is vertically swingable relative to the bracket 17 but is normally resiliently retained in a predetermined position of setting by means of a retaining spring 33 detachably secured to the bracket 17 by any suitable means. The retaining means 33 normally resiliently retains the lever 22 in mid or normal position as disclosed in Figs. 2 and 3.

The means for locking the bracket 17 in a predetermined position relatively to the main frame 18 comprises a notched member 24 extending across the front of the edger, and a locking latch 23 pivotally mounted upon the shifting lever 22 by means of a horizontal pivot 26, and normally held in engagement with the notched member 24 by means of a helical compression spring 37. The latch 23 is provided with a laterally adjustable toothed locking element which engages the teeth of the member 24. The adjustability of this toothed locking element provides for proper engagement of the coacting teeth. The bracket 17 is provided with a shoulder which is engageable with the lower portion of the member 24 to limit the upward movement of the bracket 17. A positive stop 25 provided with teeth which are engageable with the teeth of the member 24, is adjustable to any position along the member 24. The member 24 may, if desired, be provided with a gage similar to the gage 32, in order to permit accurate positioning of the stop 25. The shifting lever 22 may be positively locked to the bracket 17 by means of a pin 30 passing transversely through alined openings in the lever 22 and bracket 17. This pin lock is utilized when it is desired to shift the saws manually only.

During normal operation of the edger, the saws 1 are rotated in the usual manner and the lumber is fed to the saws over the feed rollers 2. If it is desired to shift one of the saws, this may be done by gripping the handle of the corresponding lever 22 and pressing the latch 23 so as to disengage the notched member 24. The lever 22 may then be swung about the pivot 29 either upwardly or downwardly to engage one or the other of the traveling portions of the chain 12 and to grip this traveling portion between the corresponding shoe 27, 28 and the adjacent bracket gripping shoe 35, 36. As the chain portion is gripped the bracket 17 is moved along the supports 20, 21 and the shifter arm 19 moves the adjacent saw laterally along its shaft. By swinging the lever 22 either upwardly or downwardly, the corresponding saw may be moved either to the right or to the left. As the lever 22 is swung either upwardly or downwardly, the spring 33 resiliently retains the lever in such position, such retention being readily overcome, however, by a slight pressure upon the lever 22. If it is desired to utilize the positive stop 25, this stop may be set in the predetermined position corresponding to the final position of setting of the saw which is desired, and the bracket 17 will be automatically prevented from traveling beyond the desired position by engagement of the bracket 17 with the side surface of the rear portion of the stop 25. As the positive stop 25 is engaged, the gripping shoe 27, 28 and the coöperating gripping shoe 35, 36 will be compelled to slip upon the engaged traveling chain portion. It is to be noted, however, that as the operator of this device becomes accustomed to manipulating the same, the positive stop will become unnecessary, as accurate setting will be attainable without such stop.

It will thus be noted that the traveling member or chain 12 provides a simple and efficient means for shifting the saws by means of power operated mechanism. The device may be readily applied to existing edgers and the parts which are subjected to wear may be readily renewed. By making the locking portion of the latch 23 movable for disengagement with the notched member 24, at right angles to the direction of motion of the gripping shoe 27, 28, the position of the saws cannot be altered until after the latch 23 has been withdrawn from the member 24. Such withdrawal may, however, be readily accomplished simultaneously with the gripping movement of the lever 22, thereby producing a rapidly operable mechanism. By providing the resilient retaining means or spring 33, the operator is relieved from sustaining the weight of the lever 22 during shifting while he is at the same time permitted to readily restore the lever 22 to its normal position without great exertion.

It should be understood that it it is not desired to be limited to the exact details of construction herein shown and described, for obvious modifications within the scope of the appended claims may occur to a person skilled in the art.

It is claimed and desired to secure by Letters Patent:

1. In combination, a laterally movable saw, a shifter directly engageable with said saw, a power driven traveling element movable laterally relatively to said saw, and means for temporarily connecting said shifter and said element to move said saw.

2. In combination, a laterally movable saw, a shifter associated with said saw, a portion of an element movable in one direction, a portion of an element movable in the opposite direction, and means for connecting said shifter to either of said portions to move said saw in either direction.

3. In combination, a laterally movable saw, a shifter associated with said saw, an endless element having oppositely traveling portions, and means for interchangeably connecting said shifter to either of said portions to move said saw in either direction.

4. In combination, a laterally movable saw, a shifter associated with said saw, a traveling element movable laterally of said saw, means movable in one direction to lock said shifter in a predetermined position, and means movable in a direction substantially at right angles to the direction of movement of said movable means to connect said shifter and said element.

5. In combination, a laterally movable saw, a shifter associated with said saw, an endless element having oppositely traveling portions movable laterally of said saw, means movable in a substantially vertical direction for connecting said shifter to said portions, and means movable in a substantially horizontal direction for locking said shifter in a predetermined position and for releasing the same.

6. In combination, a laterally movable saw, an endless element having oppositely traveling portions, and means for interchangeably connecting said saw to either of said portions to move said saw laterally in either direction.

7. In combination, a laterally movable saw, a shifter associated with said saw, an element movable laterally relatively to said saw, said element being movable continuously during operation of the machine, and means for temporarily connecting said shifter and said element to move said saw.

8. In combination, a plurality of laterally movable parallel saws, a shifter directly engageable with each of said saws, a single element movable laterally relatively to said saws, and means for independently connecting said shifters to said element to move said saws.

9. In combination, a plurality of laterally movable parallel saws, a single element movable laterally relatively to said saws, and means for independently connecting said saws to said element to move said saws with said element.

10. In combination, a plurality of laterally movable parallel saws, a single endless element having oppositely traveling portions, and means for independently and interchangeably connecting said saws to either of said portions to move said saws laterally in either direction.

In testimony whereof, the signature of the inventor is affixed hereto.

WILLIAM G. HAGMAIER.